US008282047B2

(12) United States Patent
Franks

(10) Patent No.: US 8,282,047 B2
(45) Date of Patent: Oct. 9, 2012

(54) CABLE TIE WITH INSERT FASTENER

(75) Inventor: John R. Franks, Hopkinton, MA (US)

(73) Assignee: Avery Dennison Corporation, Pasadena, CA (US)

(*) Notice: Subject to any disclaimer, the term of this patent is extended or adjusted under 35 U.S.C. 154(b) by 132 days.

(21) Appl. No.: 11/547,984

(22) PCT Filed: Apr. 8, 2005

(86) PCT No.: PCT/US2005/011952
§ 371 (c)(1),
(2), (4) Date: Jun. 20, 2008

(87) PCT Pub. No.: WO2005/099402
PCT Pub. Date: Oct. 27, 2005

(65) Prior Publication Data
US 2008/0250609 A1 Oct. 16, 2008

Related U.S. Application Data

(60) Provisional application No. 60/560,955, filed on Apr. 9, 2004.

(51) Int. Cl.
*F16B 45/00* (2006.01)
(52) U.S. Cl. ........... 248/71; 248/74.3; 24/16 R; 411/508
(58) Field of Classification Search ............. 248/71, 248/73, 74.3, 74.5, 67.5, 70, 65; 24/16 R, 24/297, 453, 16 PB; 411/508, 509, 510, 411/913
See application file for complete search history.

(56) References Cited

U.S. PATENT DOCUMENTS

| 2,424,757 | A | * | 7/1947 | Klumpp, Jr. | 174/153 G |
| 3,079,581 | A | * | 2/1963 | Klumpp, Jr. | 439/557 |
| 3,678,797 | A | * | 7/1972 | Seckerson | 411/509 |
| 3,775,927 | A | * | 12/1973 | Meyer | 52/718.06 |
| 3,810,279 | A | * | 5/1974 | Swick et al. | 411/509 |
| 3,830,134 | A | * | 8/1974 | Erickson | 411/15 |
| 4,490,886 | A | * | 1/1985 | Omata | 24/16 PB |
| 4,704,059 | A | * | 11/1987 | Nakama et al. | 411/182 |
| 4,712,341 | A | * | 12/1987 | Harris et al. | 52/208 |
| 4,735,387 | A | * | 4/1988 | Hirano et al. | 248/71 |

(Continued)

FOREIGN PATENT DOCUMENTS
DE 10245276 A1 * 4/2004
(Continued)

*Primary Examiner* — Kimberly Wood
(74) *Attorney, Agent, or Firm* — Kriegsman & Kriegsman

(57) ABSTRACT

A one-piece cable tie includes a locking head and an attached strap, the locking head being adapted to receive and selectively engage a portion of the strap when the tie is formed into a closed loop. The cable tie additionally includes an insert fastener formed onto the locking head that is sized and shaped to be retained within a rectangular slot formed in a panel. The insert fastener includes a pair of spaced apart, parallel arms which extend orthogonally away from an outer end wall of the locking head, a cross-member extending transversely across the free ends of the pair of arms and a pair of offset retention fingers. Each retention finger is connected at one end to the cross-member and is capable of being independently pivotally displaced along an arcuate path. As a result of the offset design of its retention fingers, the cable tie can be manufactured as a unitary plastic member using simplified and inexpensive molding techniques.

4 Claims, 18 Drawing Sheets

U.S. PATENT DOCUMENTS

| | | | |
|---|---|---|---|
| 4,762,437 A * | 8/1988 | Mitomi | 403/11 |
| 4,787,795 A * | 11/1988 | Kraus | 411/510 |
| 4,865,505 A * | 9/1989 | Okada | 411/512 |
| 4,906,152 A * | 3/1990 | Kurihara | 411/182 |
| 4,927,306 A * | 5/1990 | Sato | 411/182 |
| 5,131,613 A * | 7/1992 | Kamiya et al. | 248/74.3 |
| 5,306,098 A * | 4/1994 | Lewis | 411/510 |
| 5,402,970 A * | 4/1995 | Fujishita | 248/74.3 |
| 5,448,809 A * | 9/1995 | Kraus | 24/453 |
| 5,592,719 A * | 1/1997 | Eto et al. | 24/453 |
| 5,651,634 A * | 7/1997 | Kraus | 403/408.1 |
| 5,651,652 A * | 7/1997 | Williams et al. | 411/508 |
| 5,669,731 A * | 9/1997 | Hironaka et al. | 403/397 |
| 5,706,559 A * | 1/1998 | Oliver et al. | 267/49 |
| 5,947,631 A * | 9/1999 | Hironaka et al. | 403/397 |
| 6,203,240 B1 * | 3/2001 | Hironaka et al. | 403/397 |
| 6,253,423 B1 * | 7/2001 | Friedrich et al. | 24/293 |
| 6,283,512 B1 * | 9/2001 | Butterbaugh et al. | 292/87 |
| 6,474,921 B1 * | 11/2002 | Gordon | 411/508 |
| 6,575,681 B2 * | 6/2003 | Kojima et al. | 411/508 |
| 6,749,157 B2 | 6/2004 | Takeuchi | |
| 6,848,874 B2 * | 2/2005 | Lowry et al. | 411/182 |
| 7,179,013 B2 * | 2/2007 | Benedetti | 403/388 |
| 7,186,051 B2 * | 3/2007 | Benedetti et al. | 403/388 |
| 7,186,068 B2 * | 3/2007 | Zoubek et al. | 411/510 |
| 2002/0131846 A1 * | 9/2002 | Kojima et al. | 411/508 |
| 2002/0194710 A1 * | 12/2002 | Dickinson et al. | 24/295 |
| 2003/0159256 A1 * | 8/2003 | Clarke | 24/297 |
| 2003/0231939 A1 * | 12/2003 | Lowry et al. | 411/182 |
| 2004/0016088 A1 * | 1/2004 | Angellotti | 24/297 |
| 2004/0223805 A1 * | 11/2004 | Benedetti et al. | 403/316 |

FOREIGN PATENT DOCUMENTS

GB    2316707 A  *  3/1998

* cited by examiner

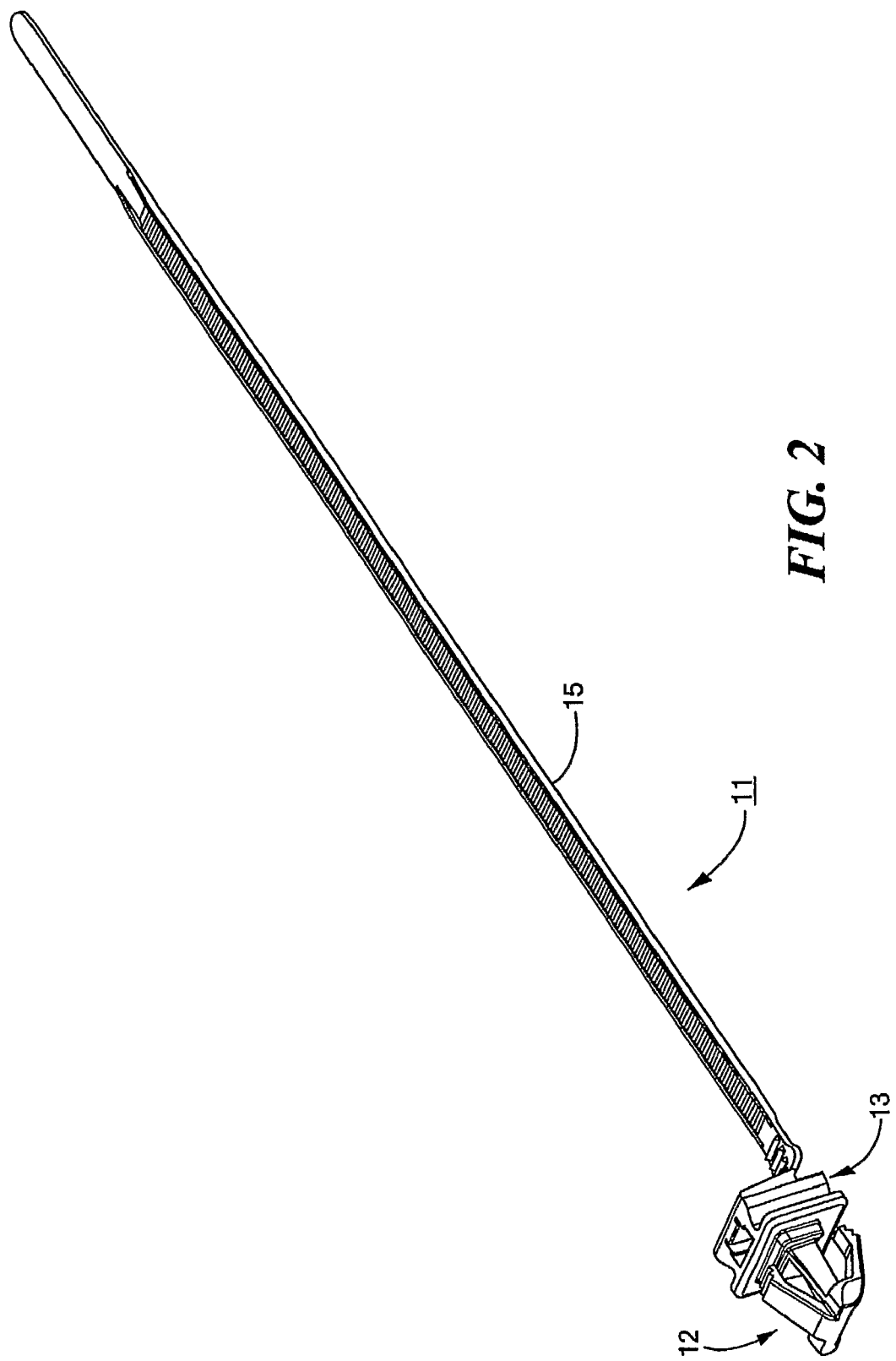

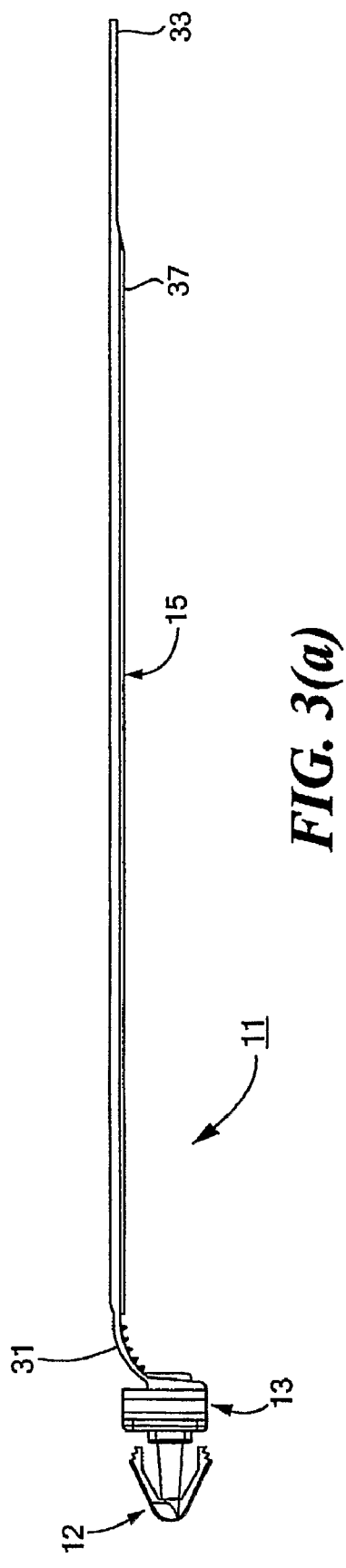
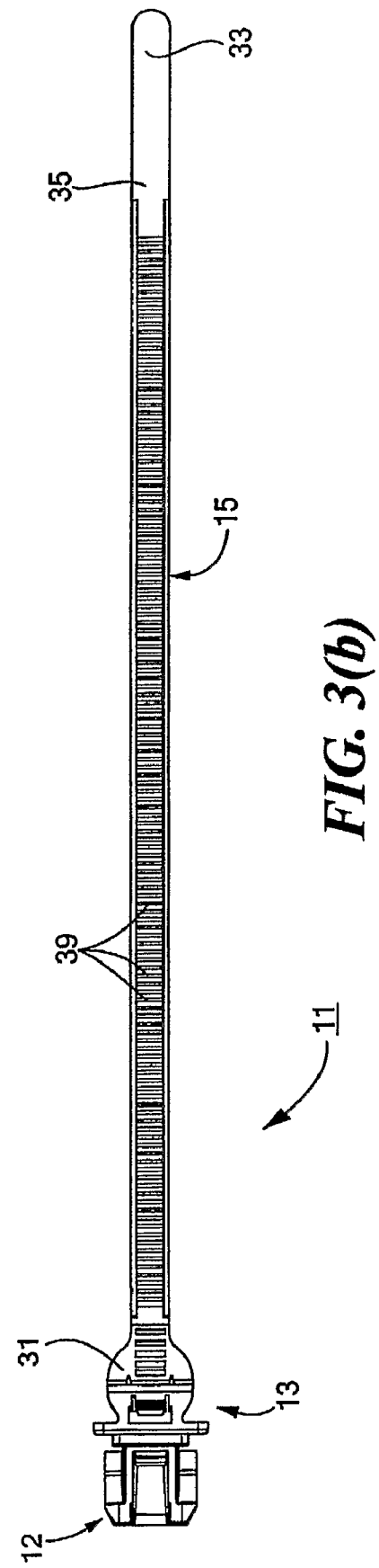
FIG. 3(a)
FIG. 3(b)

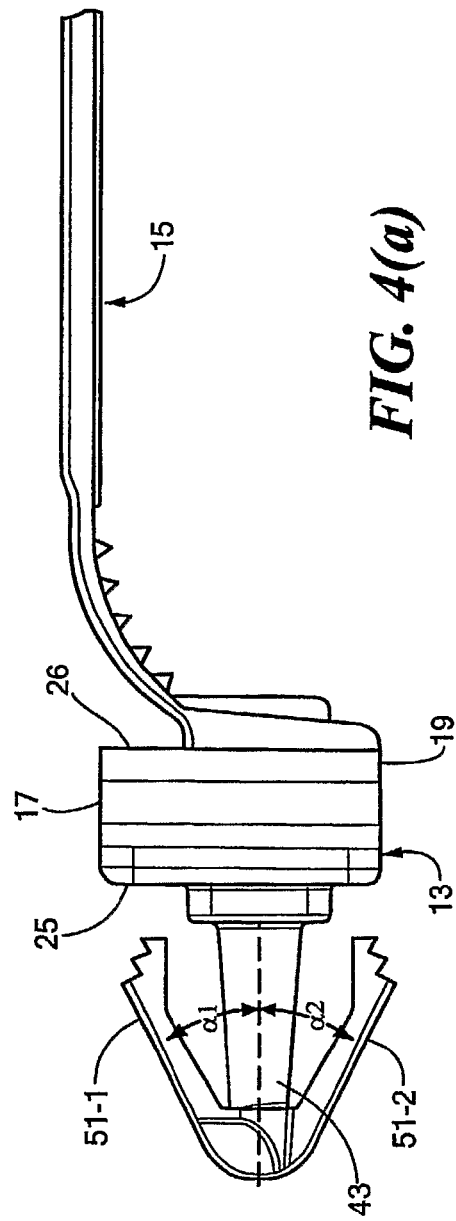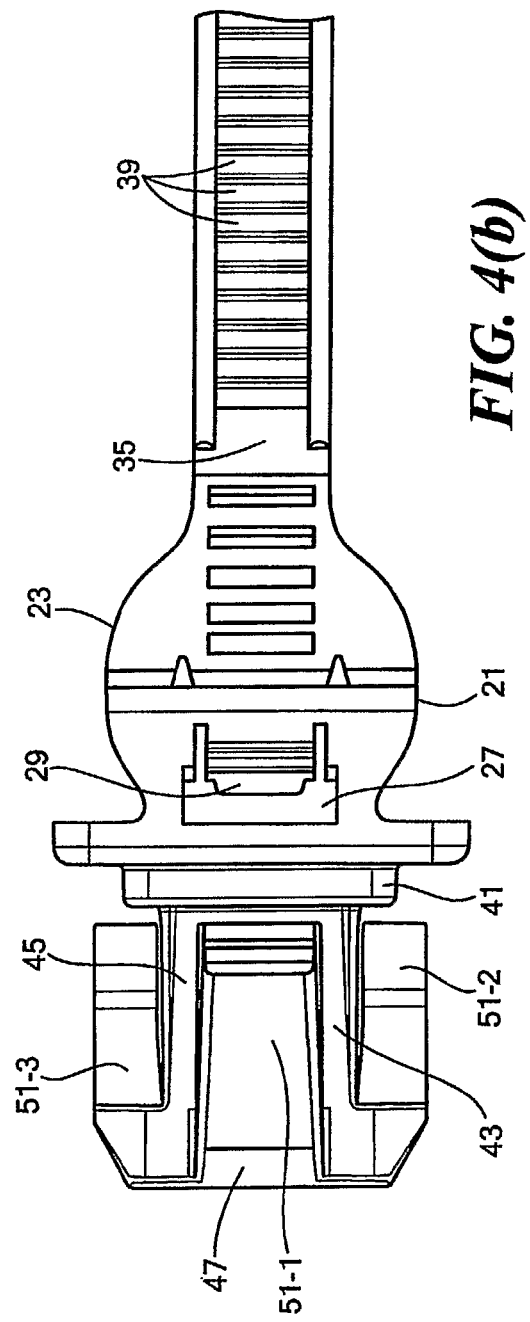
FIG. 4(a)
FIG. 4(b)

CABLE TIE WITH INSERT FASTENER

CROSS-REFERENCE TO RELATED APPLICATIONS

The present application claims the benefit under 35 U.S.C. 119(e) of U.S. Provisional Patent Application Ser. No. 60/560,955, filed Apr. 9, 2004, the disclosure of which is incorporated herein by reference.

BACKGROUND OF THE INVENTION

The present invention relates generally to ties and, more particularly, to ties which can be formed into a closed loop.

Ties are well known in the art and are widely used in a variety of different applications.

One tie which is well known and widely used in the art is the cable tie. Cable ties are commonly used in commerce to bundle together of a plurality of objects, such as a group of parallel wires.

One type of cable tie which is well known in the art comprises a serrated strap which is fitted to an apertured head. In use, the cable tie can be formed into closed loop by inserting the serrated strap through the apertured head. With the serrated strap inserted through the apertured head, an internal pawl, or locking tang, disposed within the apertured head lockably engages the serrations of the strap to prevent the strap from being backed out of the apertured head. In this manner, the engagement of the internal pawl onto the serrated strap secures the cable tie in its closed loop configuration.

A cable tie of the type described above is typically used in the following manner to bundle together a plurality of parallel wires. Specifically, with the plurality of wires grouped together, the strap of the cable tie is wrapped around the bundle of wires. The free end of the strap is then inserted through the apertured head so as to form a closed loop around the bundle. With the cable tie formed into a closed loop, the free end of the strap is advanced through the apertured head to cinch the cable tie strap tightly around the bundle.

In certain applications, it is often desirable to retain a group of wires bundled with a cable tie securely against a flat surface. In particular, in the automotive industry it is often desirable to retain a group of electrical wires bundled with a cable tie securely against an automotive panel so as to preclude the bundle from moving (i.e., rattling) within the automobile body during operation of the car.

Accordingly, cable ties are commonly provided with an insert fastener (also referred to herein simply as a fastener) which can be coupled to an automotive panel. Commonly, the insert fastener is integrally formed directly onto the head of the cable tie and is sized and shaped to fittingly penetrate through an existing opening in the automotive panel. When disposed through the opening, retaining members on the insert fastener engage the automotive panel so as to secure the fastener to the panel. In this manner, the plurality of wires which are bundled together by the cable tie are, in turn, retained against the automotive panel, which is highly desirable.

Insert fasteners are commonly constructed in a variety of different configurations. Christmas (or fir) tree type fasteners and arrowhead type fasteners are two well known types of insert fasteners which are commonly formed onto a cable tie. An example of a cable tie with a Christmas tree fastener is described in U.S. Pat. No. 5,921,510 to J. C. Benoit et al., which is incorporated herein by reference. An example of a cable tie with an arrowhead fastener is described in U.S. Pat. No. 5,333,822 to J. C. Benoit et al., which is also incorporated herein by reference.

Christmas tree and arrowhead type fasteners are typically manufactured with a profile which enables it to be fittingly inserted through an opening in an automotive panel which is circular in shape. However, it has been found that insert fasteners which are designed for penetration through circular openings suffer from a few notable drawbacks.

As a first drawback, insert fasteners which are designed for penetration through circular openings require a significant degree of precision by the user in deciding where along the length of the bundle around which the cable tie is to be wrapped. Specifically, each cable tie must be wrapped around the bundle of wires at the precise location along the length of the bundle such that the insert fastener is disposed in direct alignment with the circular opening in the panel. Stated another way, if a panel is provided with a pair of circular openings and a pair of corresponding cable ties (each of which includes an insert fastener) are used to bundle a plurality of wires, the distance between the pair of insert fasteners on the cable ties must be roughly equal to the distance between the corresponding pair of openings in the panel. Otherwise, one of the insert fasteners will not be in proper alignment for penetration through its associated circular opening in the panel.

As a second drawback, automotive panels are presently manufactured with slots which are rectangular in nature and, as can be appreciated, insert fasteners having a circular profile do not properly retain within a rectangular slot in a panel. Accordingly, because insert fasteners are typically designed for use with pre-existing openings in the panel, insert fasteners having a circular profile are often precluded from use with conventional automotive panels which include rectangular slots, which is highly undesirable.

As a third drawback, insert fasteners having a circular profile can not be secured to an automotive panel in such a manner so as to preclude its rotation about its longitudinal axis. Rather, since both the insert fastener and the opening include circular profiles, it is understood that the fastener is free to rotate about the center of the opening, which is undesirable in certain applications.

Accordingly, cable ties which include an insert fastener that is specifically designed for penetration through a rectangular slot are well known in the art. These types of cable ties typically include an insert fastener which has a rectangular profile. Examples of cable ties which include an insert fastener having a substantially rectangular profile include U.S. Pat. No. 5,385,321 to K. Kume et al., and U.S. Pat. No. 5,131,613 to H. Kamiya, et al., both of which are incorporated herein by reference.

Referring now to FIG. 1, there is shown a flat automotive panel P which is shaped to define a slot S which is substantially rectangular in longitudinal cross-section. Substantially rectangular slot S is defined by a top edge 1, a bottom edge 3, a first side edge 5 and a second side edge 7, wherein top edge 1 and bottom edge 3 extend parallel to one another and wherein first side edge 5 and second side edge 7 extend parallel to one another. It should be noted that the lengths of top and bottom edges 1 and 3 are substantially longer than the lengths of first and second side edges 5 and 7. As a result, slot S has a length L which is greater than its width W.

Prior art insert fasteners of the type described above which have a substantially rectangular profile typically include a pair of outwardly projecting retention fingers. Each retention finger is adapted to pivot inward upon the application of a significant inward force thereon (i.e., a compression force applied to said fastener). Accordingly, in order to couple the insert fastener to panel P, the insert fastener is disposed through slot S. As the insert fastener is disposed through slot S, the tapered retention fingers contact selected portions of the edges in panel P which define slot S. As the insert fastener continues to be advanced through slot S, the tapered fingers inwardly compress to enable the insert fastener to project adequately through slot S. However, it should be noted that due to their resilient construction, the energy stored in the compressed retention fingers urges the fingers outward, thereby causing the fingers to continuously contact the edges formed in the panel P which define slot S. Eventually, the insert fastener is advanced until a portion of each finger (e.g., a shoulder or step formed at its free end) engages panel P. In this manner, the insert fastener is retained securely within slot S of panel P.

It should be noted that prior art insert fasteners having a substantially rectangular profile are designed such that its fingers engage first and second side edges 5 and 7 when inserted into slot S. As can be appreciated, the fact that the fingers of conventional, rectangular profile, insert fasteners engage first and second side edges 5 and 7 serves to limit the range of possible slot sizes with which the insert fastener can be used. Specifically, these fasteners can only be used with a slot S which has a particular length L, thereby limiting the potential range of possible slots with which these fasteners can be used, which is highly undesirable. In particular, these fasteners would be unable to fit within a slot having a length less than length L and, to the contrary, would fail to engage the side edges of a slot having a length greater than length L.

Accordingly, it is a principal object of the present invention to provide a cable tie which includes an insert fastener which is adapted to engage top edge 1 and bottom edge 3 (rather than side edges 5 and 7) when inserted through slot S. In this manner, such a fastener could be adequately retained within slot S regardless of its length L, which is highly desirable.

SUMMARY OF THE INVENTION

It is an object of the present invention to provide a new and improved one-piece cable tie which includes a serrated strap fitted to an apertured head.

It is another object of the present invention to provide a cable tie of the type as described above which includes an insert fastener that is designed for penetration through a rectangular slot in a panel.

It is yet another object of the present invention to provide a cable tie of the type as described above which includes an insert fastener having a substantially rectangular profile.

It is still another object of the present invention to provide a cable tie of the type as described above which includes an insert fastener designed to engage the top and bottom edges which define the rectangular slot in the panel through which said fastener is inserted.

It is yet still another object of the present invention to provide a cable tie of the type as described above which includes a limited number of parts, which is easy to use and which is inexpensive to manufacture.

Therefore, according to one feature of the present invention, there is provided a cable tie comprising: (a) a head shaped to include an elongated strap accepting channel, the strap accepting channel having a longitudinal axis, said head comprising a locking member which is disposed to project into the strap accepting channel, (b) a strap having a first end and a second end, the first end being formed onto said head, said strap being sized and shaped to be inserted into the strap accepting channel so said cable tie forms a closed loop, said strap being adapted to be engaged by said locking member when said cable tie is formed into a closed loop, and (c) an insert fastener formed onto at least one of said head and said strap, said insert fastener comprising a first retention finger and a second retention finger, wherein said first and second retention fingers are offset from one another.

According to another feature of the present invention, there is provided insert fastener comprising a first retention finger and a second retention finger, wherein said first and second retention fingers are offset from one another.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the present invention and, together with the description, serve to explain the principles of the invention. In the drawings, wherein like reference numerals represent like parts:

FIG. 2 is a top, left side perspective view of a first embodiment of a cable tie constructed according to the teachings of the present invention, the fastener of the cable tie being adapted to be retained within the rectangular slot shown in FIG. 1;

FIG. 3(a) is a front plan view of the cable tie shown in FIG. 2;

FIG. 3(b) is a top plan view of the cable tie shown in FIG. 2;

FIG. 4(a) is an enlarged, fragmentary, front plan view of the cable tie shown in FIG. 2;

FIG. 4(b) is an enlarged, fragmentary, top plan view of the cable tie shown in FIG. 2;

DETAILED DESCRIPTION OF A PREFERRED EMBODIMENT

Figure 1:
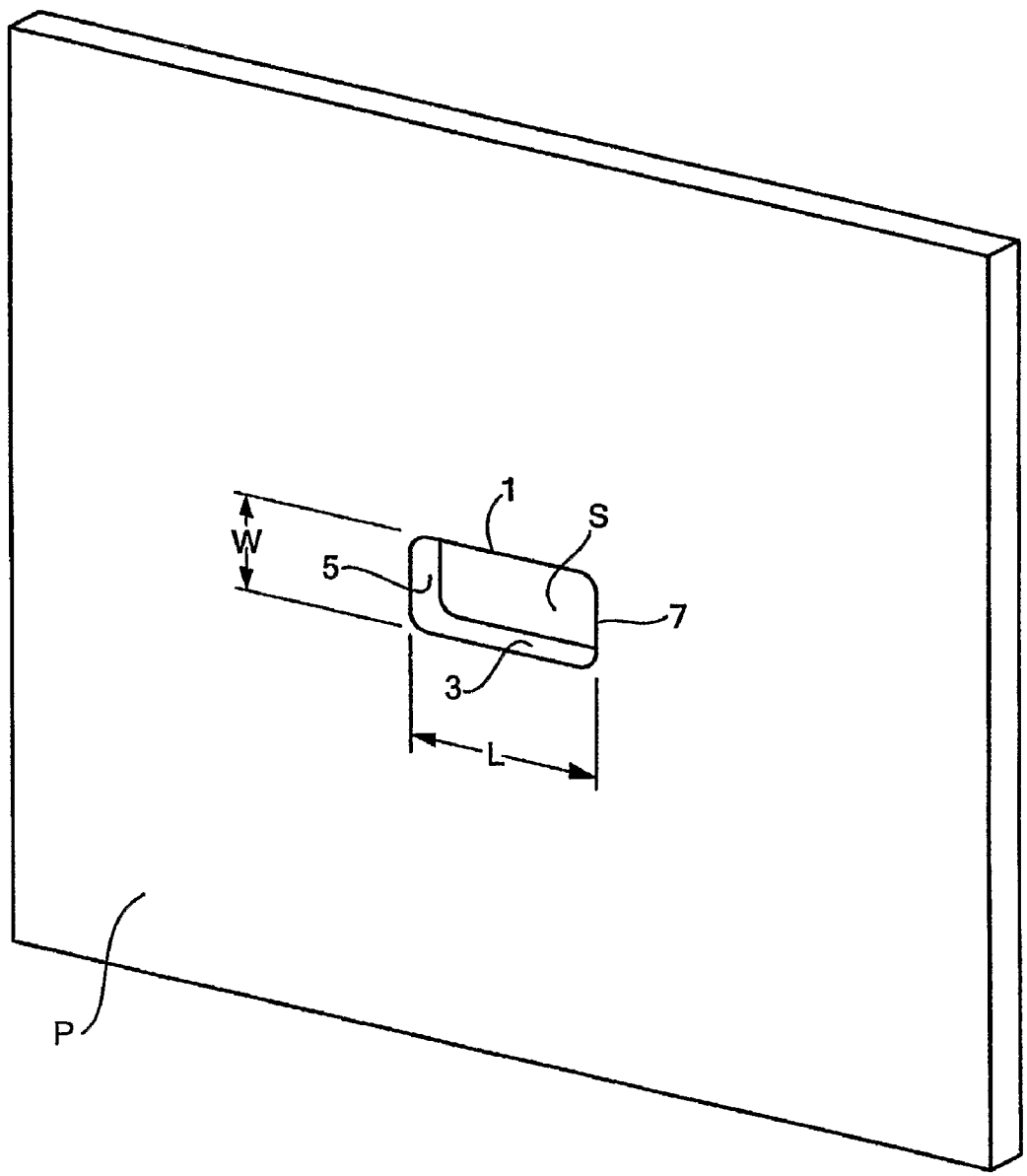
FIG. 1 is a front, left side perspective view of an automotive panel which includes a substantially rectangular slot.

Referring now to FIGS. 2-8, there is shown a first embodiment of a cable tie (also referred to herein simply as a tie) which is constructed according to the teachings of the present invention, the tie being identified generally as reference numeral 11. As will be described further in detail below, tie 11 includes an insert fastener 12 which has a novel design, fastener 12 being sized and shaped to be securely retained within a rectangular slot S formed into an automotive panel P.

Tie 11 comprises a locking head 13 and an attached strap 15, with fastener 12 formed onto one end of locking head 13. Preferably, tie 11 is manufactured of a plastic material, such as nylon, and is formed as a single piece using conventional molding techniques.

As seen most clearly in FIGS. 4(a) and 4(b), locking head 13 is generally rectangular in shape and comprises a top wall 17, a bottom wall 19, a front wall 21, a rear wall 23, an outer end wall 25 and an inner end wall 26. Together, top wall 17, bottom wall 19, front wall 21, rear wall 23, outer end wall 25 and inner end wall 26 define a strap accepting channel 27 which extends transversely through head 13 from top wall 17 to bottom wall 19.

Locking head 13 is shaped to include a pivotable locking pawl, or tang, 29 which projects into strap accepting channel 27. As will be described below, with strap 15 inserted into channel 27, locking pawl 29 is designed to engage strap 15 to secure tie 11 in its closed loop configuration.

As seen most clearly in FIGS. 3(a) and 3(b), strap 15 is an elongated flexible member which is generally uniform and rectangular in lateral cross-section. However, it is to be understood that strap 15 could be constructed in alternative sizes and shapes without departing from the spirit of the present invention.

Strap 15 comprises a first end 31, a second end 33, a top surface 35 and a bottom surface 37. First end 31 of strap 15 is integrally connected to inner end wall 26 of head 13 so as to render tie 11 a unitary device. Strap 15 further includes a plurality of ratchet-shaped teeth 39 formed along the length of top surface 35, teeth 39 being adapted to be engaged by locking pawl 29 when tie 11 is formed into a closed loop.

Fastener 12 is integrally formed to outer end wall 25 of locking head 13. As will be described further below, fastener 12 is sized and shaped to be inserted into and at partially through a rectangular slot S in an automotive panel P, fastener 12 engaging top edge 1 and bottom edge 3 to retain cable tie 11 against panel P.

As seen most clearly in FIGS. 5-8, fastener 12 comprises a rectangular base 41 which is integrally formed onto outer end wall 25 of locking head 13. A pair of spaced apart, parallel arms 43 and 45 extend orthogonally out from the outer surface of base 41. In addition, a cross-member 47 extends laterally across the free ends of arms 43 and 45. Cross-member 47 includes a top surface 47-1 which lies substantially parallel with top surface 35 of strap 15 and top wall 17 of locking head 13. Cross-member 47 additionally includes a bottom surface 47-2 which lies substantially parallel with bottom surface 37 of strap 15 and bottom wall 19 of locking head 13. Together, base 41, arms 43 and 45 and cross-member 47 define an opening 49 therebetween which is substantially rectangular lateral cross-section.

Fastener 12 further comprises a plurality of pivotable retention fingers 51 which serve to retain fastener 12 within rectangular slot S. Each retention finger 51 is capable of pivoting inward upon the application of a suitable inward (i.e., compression) force thereon. Upon removal of said inward force, each retention finger 51 is constructed to resiliently pivot back outward and return to its original, relaxed state (as represented in the drawings).

Figure 5:
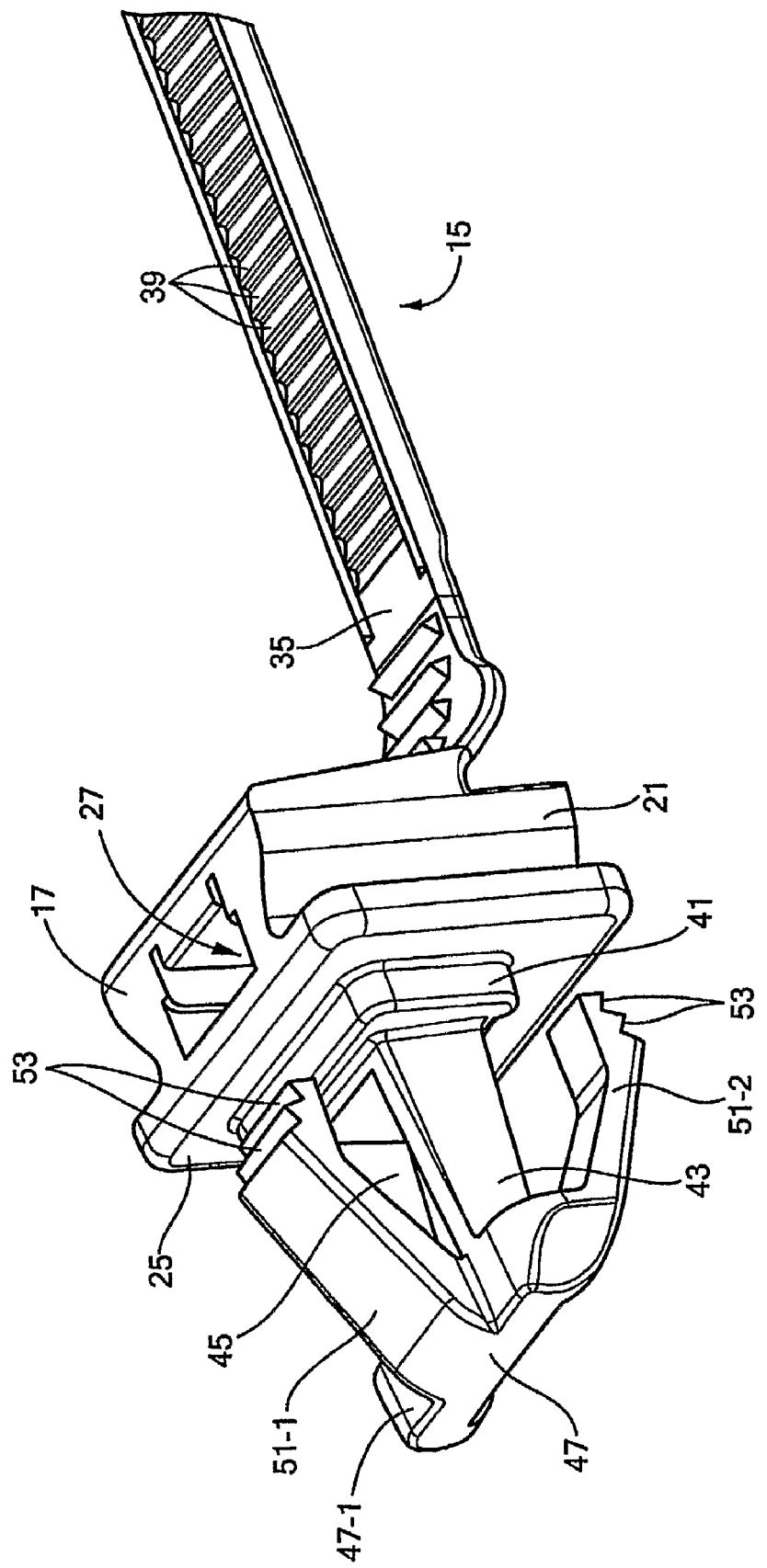
FIG. 5 is an enlarged, fragmentary top, left side perspective view of the cable tie shown in FIG. 2.
Figure 6:
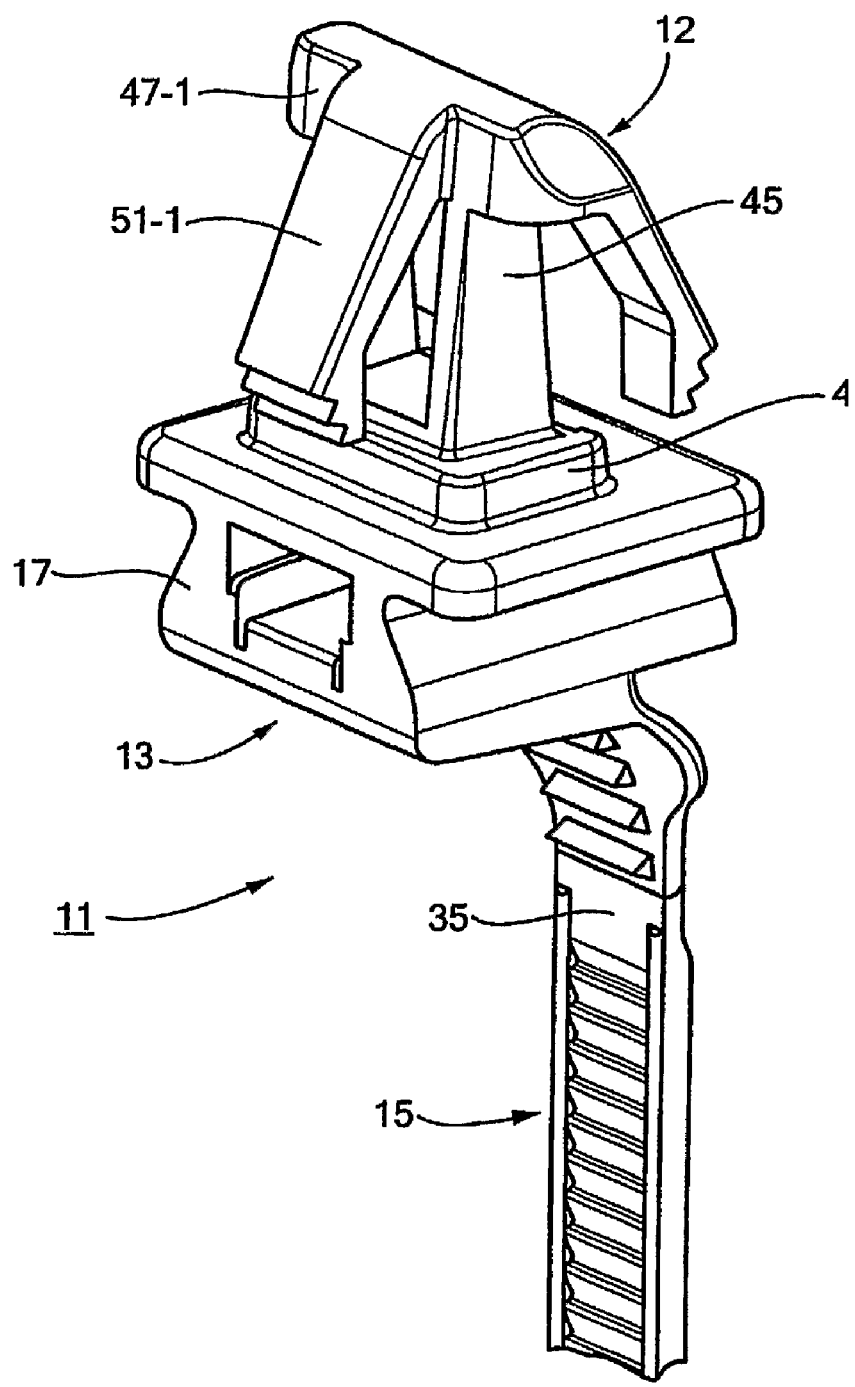
FIG. 6 is an enlarged, fragmentary, rear, top perspective view of the cable tie shown in FIG. 2.

As seen most clearly in FIGS. 5 and 6, a first retention finger 51-1 is formed onto top surface 47-1 of cross-member 47 and projects in towards locking head 13 at an upward acute angle $\alpha 1$ (as shown in FIG. 4(a)). It should be noted that first retention finger 51-1 is centered between arms 43 and 45, the width of retention finger 51-1 being less than the width of opening 49. As such, upon its inward displacement, retention finger 51-1 aligns entirely between arms 43 and 45 and entirely within opening 49. As can be appreciated, because retention finger 51-1 aligns entirely within opening 49, retention finger 51-1 is more suitably designed for molding, as will be described further in detail below.

Figure 7:
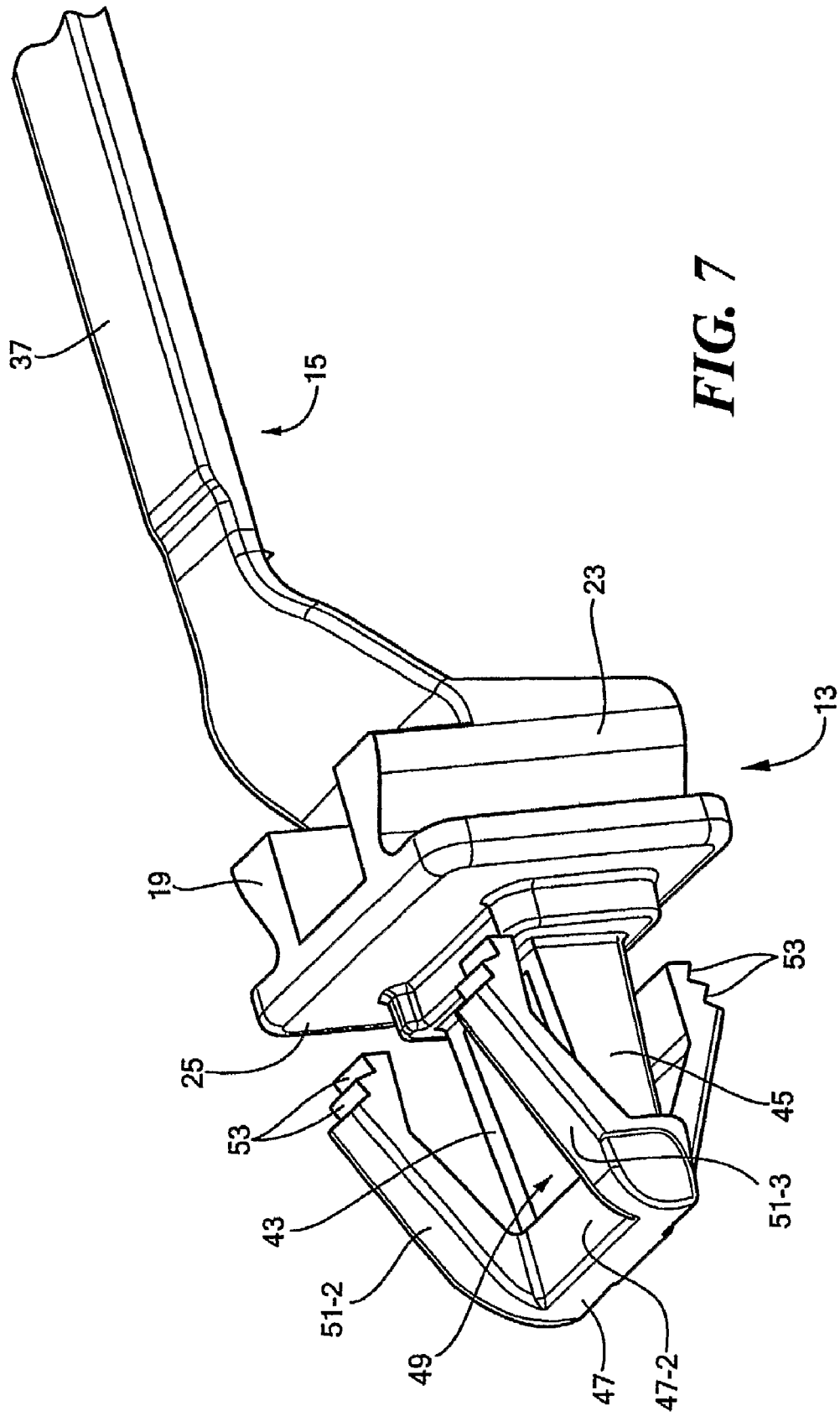
FIG. 7 is an enlarged, fragmentary, bottom, left side perspective view of the cable tie shown in FIG. 2.
Figure 8:
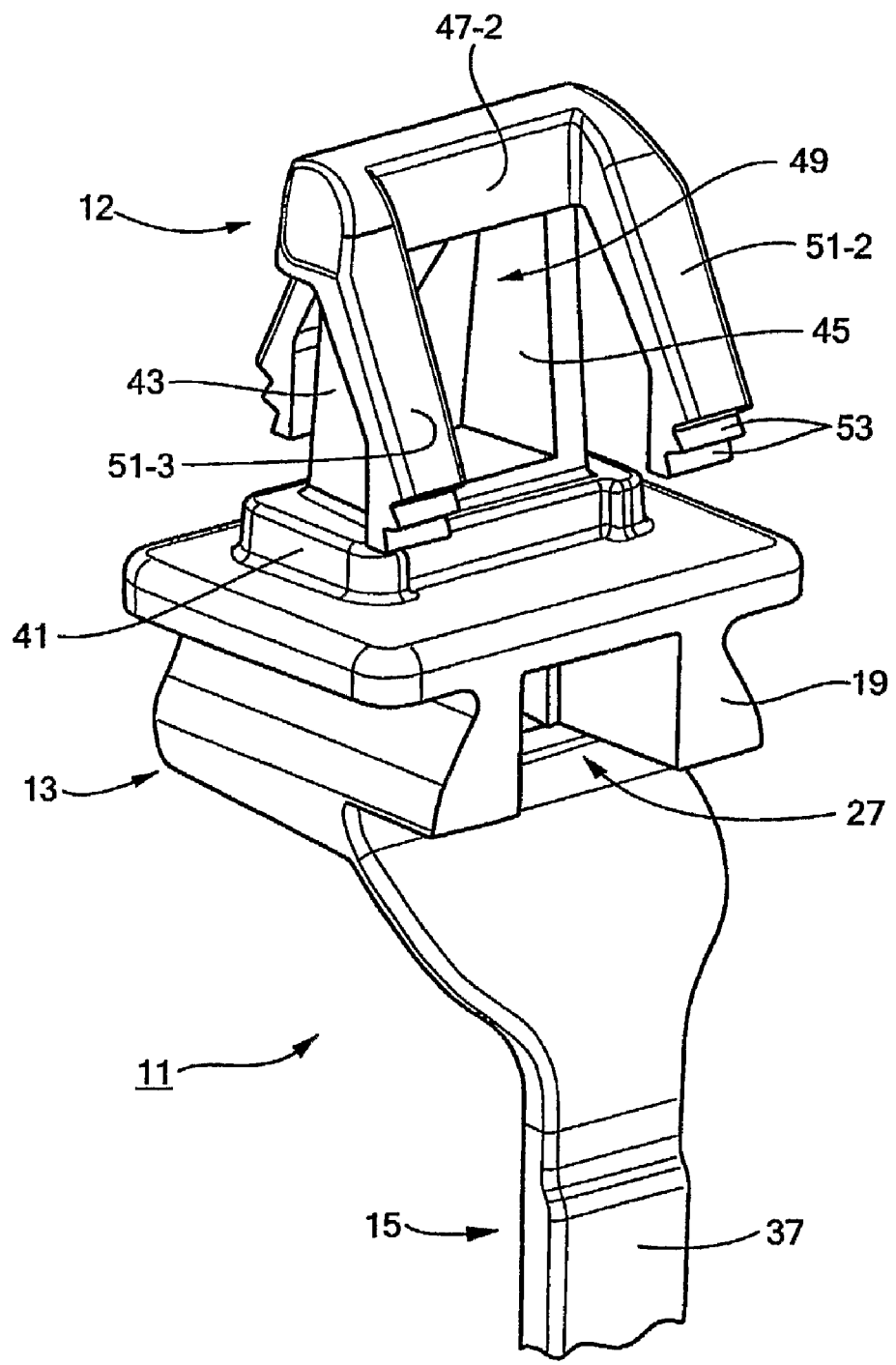
FIG. 8 is an enlarged, fragmentary, bottom, rear perspective view of the cable tie shown in FIG. 2.

As seen most clearly in FIGS. 7 and 8, a second retention finger 51-2 is formed onto bottom surface 47-2 of cross-member and projects in towards locking head 13 at a downward acute angle $\alpha 2$ (as shown in FIG. 4(a)). Similarly, a third retention finger 51-3 is formed onto bottom surface 47-2 of cross-member and projects in towards locking head 13 at a downward acute angle $\alpha 2$ (as shown in FIG. 4(a)). It should be noted that second retention finger 51-2 is positioned outside of arm 43 and third retention finger 51-3 is positioned outside of arm 45. As can be appreciated, because retention fingers 51-2 and 51-3 are disposed outside of arms 43 and 45, respectively, retention fingers 51-2 and 51-3 are more suitably designed for molding, as will be described further in detail below.

It should be noted that fastener 12 is specifically designed to include a plurality of retention fingers 51 which are offset from one another. As defined herein, the term "offset" as used with respect to retention fingers 51 denotes that the arcuate path through which each retention finger pivots 51 is orientated so as not to transect the arcuate path through which any other retention finger 51 pivots. Stated another way, retention fingers 51 are configured such that no two retention fingers 51 align for contact with another upon the application of a suitable compressive force onto fastener 12.

As a result of its unique offset retention finger design, fastener 12 is constructed such that the top and bottom surfaces of each retention finger 51 are accessible (i.e., unblocked) for molding purposes from both the top direction and the bottom direction. Accordingly, cable tie 11 can be easily manufactured as a unitary plastic member using conventional molding techniques, which is a principal object of the present invention.

As noted above, each retention finger 51 is adapted for inward pivotable displacement. The outer surface of each retention finger 51 is shaped to include one or more steps 53 proximate its free end. As can be appreciated, with fastener 12 disposed within slot S, one step 53 on retention finger 51-1 is adapted to engage top edge 1. Similarly, one step 53 on each of retention fingers 51-2 and 51-3 is adapted to engage bottom edge 3. Together, retention fingers 51 create a suitable retention force to secure fastener 12 within slot S. It should be noted that the multi-stepped configuration of each retention finger 51 enables fastener 12 to be retained within a slot S of slightly varying width W.

In use, tie 11 can be used to bundle a cable C and, in turn, secure the bundled cable C to an automotive panel P in the following manner. Specifically, referring now to FIGS. 9(a)-(d), strap 15 is first wrapped around cable C. Second end 33 is then inserted into strap accepting channel 27 so that tie 11 forms a closed loop around cable C, with locking pawl 29 sequentially engaging teeth 39 to preclude strap 15 from being backed out from head 13. Second end 33 is advanced through strap accepting channel 27 until strap 15 cinches tightly around cable C, as seen most clearly in FIG. 9(b).

With tie 11 wrapped around cable C, fastener 12 is then inserted into slot S. As fastener 12 is inserted into slot S, retention fingers 51 pivot inward to enable fastener 12 pass through slot S. Fastener 12 is further advanced into slot S until such time as a step 53 on retention finger 51-1 is drawn into contact against top edge 1 and a step 53 on each of retention fingers 51-2 and 51-3 is drawn into contact against bottom edge 3. At this point of insertion for fastener 12, retention fingers 51 sufficiently engage panel P so as to retain fastener 12 within slot S, as shown in FIGS. 9(a)-9(d). In this manner, cable C is secured to panel P using cable tie 11.

It should be noted that the particular design of fastener 12 provides cable tie 11 with a few notable advantages over most conventional types of cable ties.

As a first advantage, with fastener 12 retained within rectangular slot S in the manner described above, retention finger 51-1 engages top edge 1 and retention fingers 51-2 and 51-3 engage bottom edge 13 (as opposed to retention fingers 51 engaging either of side edges 15 and 17 as in most conventional types of fasteners). As can be appreciated, because retention fingers 51 engage top edge 1 and bottom edge 3 (rather than side edges 15 and 17), the length L of slot S can be increased without significantly compromising the ability of fastener 12 to be retained within slot S. As a result, fastener 12 can be used with slots of varying lengths, which is highly desirable.

As a second advantage, the offset construction of retention fingers 51 (as discussed above) allows for the entire one-piece tie 11 to be manufactured through a single molding process (i.e., using a single mold). As can be appreciated, without its novel offset retention finger design, tie 11 would require either a complex (i.e., multiple step) molding process or a multiple piece design, thereby increasing manufacturing costs, which is highly undesirable.

Figure 9A:
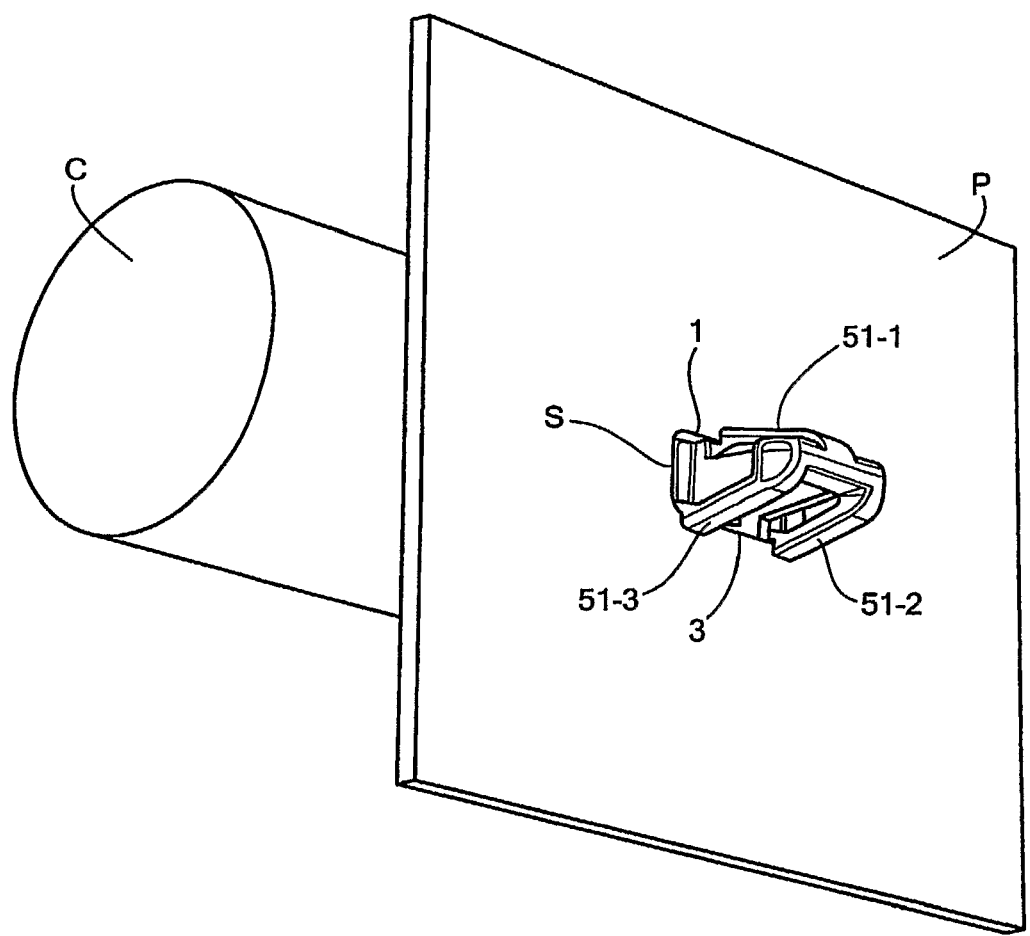
FIG. 9(a) is an enlarged, rear, bottom, left side perspective view of the cable tie shown in FIG. 2, the cable tie being shown formed into a closed loop around a cable, the fastener of the cable tie being shown retained within the slot formed in the panel shown in FIG. 1.
Figure 9B:
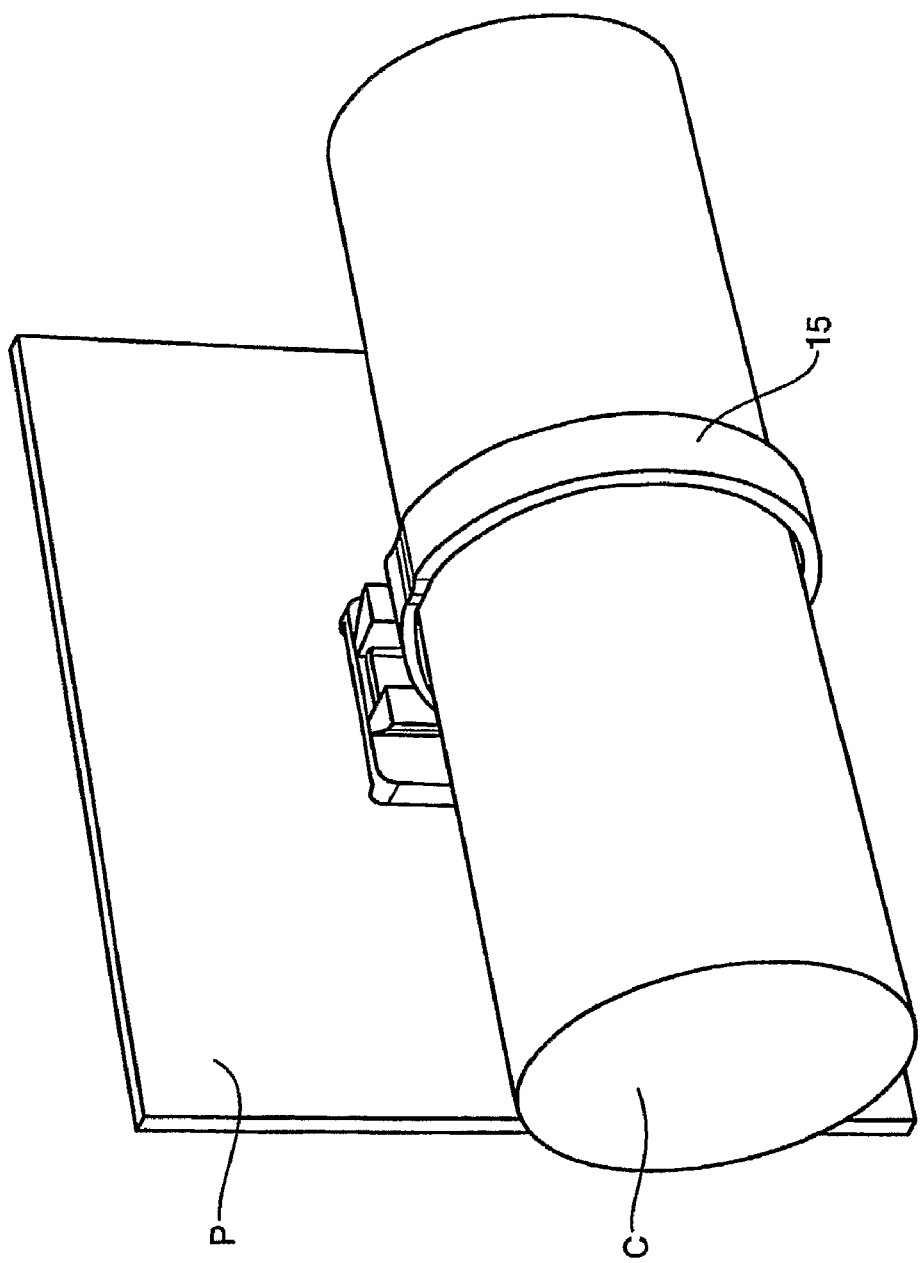
FIG. 9(b) is an enlarged, front, top, right side perspective view of the cable tie shown in FIG. 2, the cable tie being shown formed into a closed loop around a cable, the fastener of the cable tie being shown retained within the slot formed in the panel shown in FIG. 1.
Figure 9C:
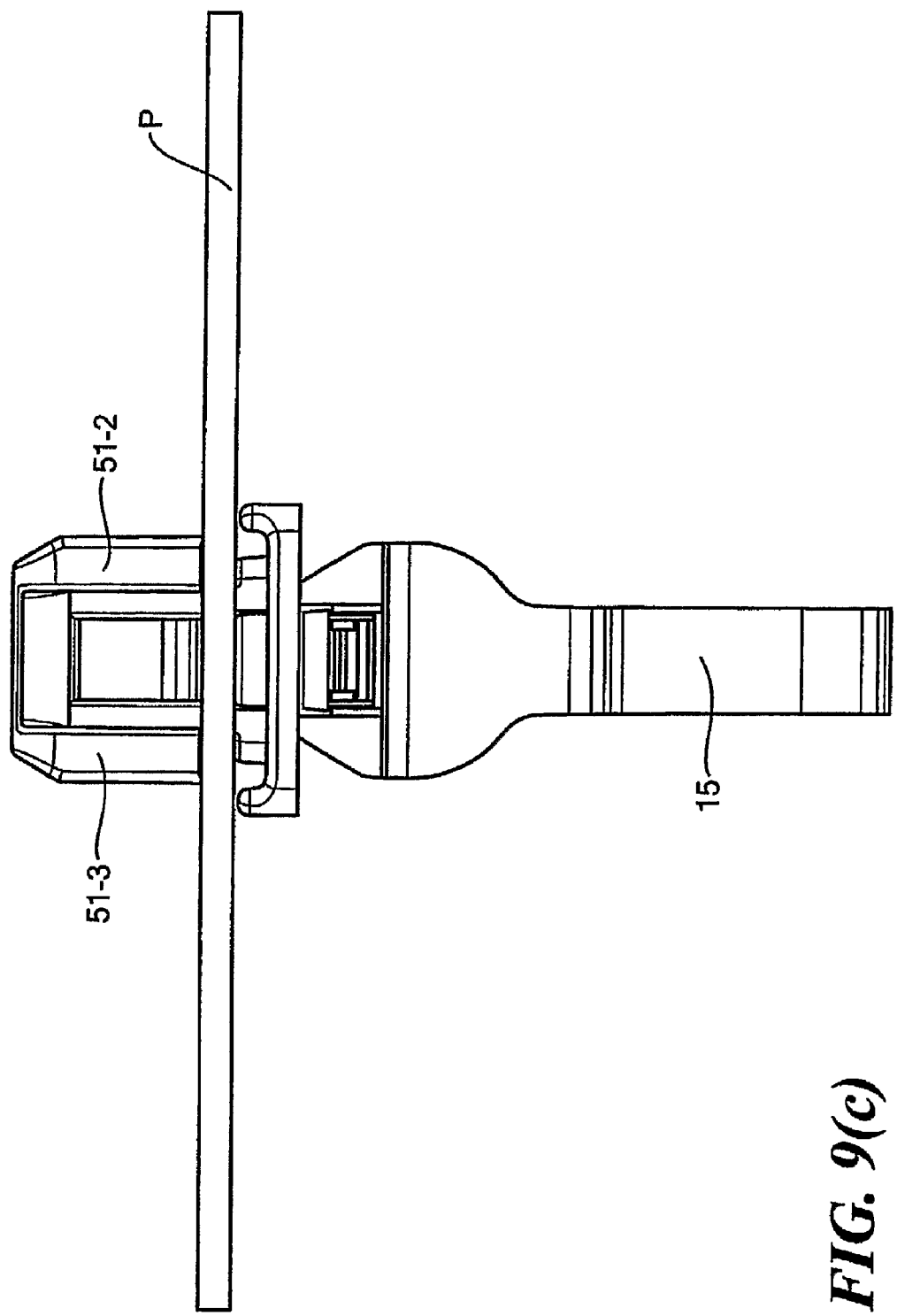
FIG. 9(c) is an enlarged, bottom plan view of the cable tie shown in FIG. 2, the cable tie being shown retained within the slot formed in the panel shown in FIG. 1.
Figure 9D:
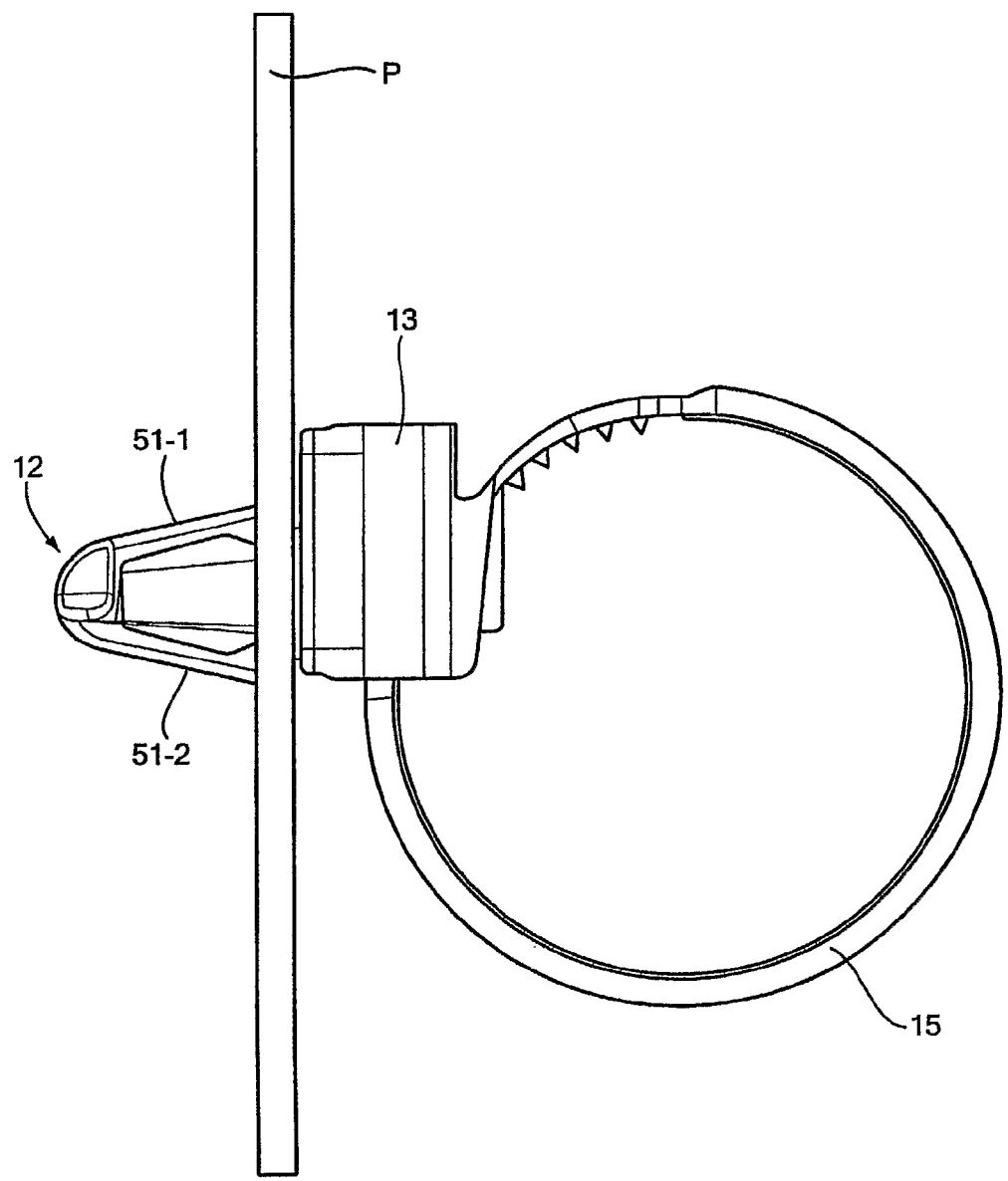
FIG. 9(d) is an enlarged, front plan view of the cable tie shown in FIG. 2, the cable tie being shown formed into a closed loop, the fastener of the cable tie being shown retained within the slot formed in the panel shown in FIG. 1.

As a third advantage, the particular orientation of retention fingers 51 (i.e., the projection of retention fingers 51 in the upward or downward direction at an acute angle relative to top wall 17 of head 13) allows fastener 12 to engage top edge 1 and bottom edge 3 of panel P (as desired) while maintaining the bundled cable C in a substantially horizontal position (i.e., parallel to the longer top and bottom edges of slot S) against panel P, as shown in FIGS. 9(a) and 9(b). As can be appreciated, in the automotive industry, it is typically required that wires bundled together to form a cable C be retained against an automotive panel in a horizontal orientation.

Figure 10A:
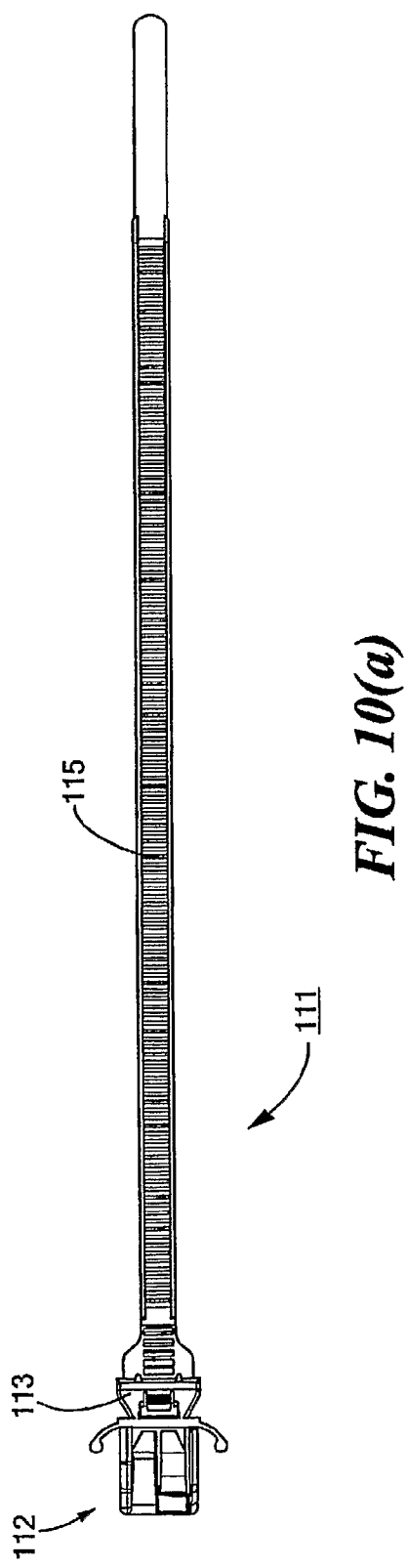
FIG. 10(a) is a top plan view of a second embodiment of a cable tie constructed according to the teachings of the present invention, the fastener of the cable tie being adapted to be retained within the rectangular slot shown in FIG. 1.
Figure 10B:
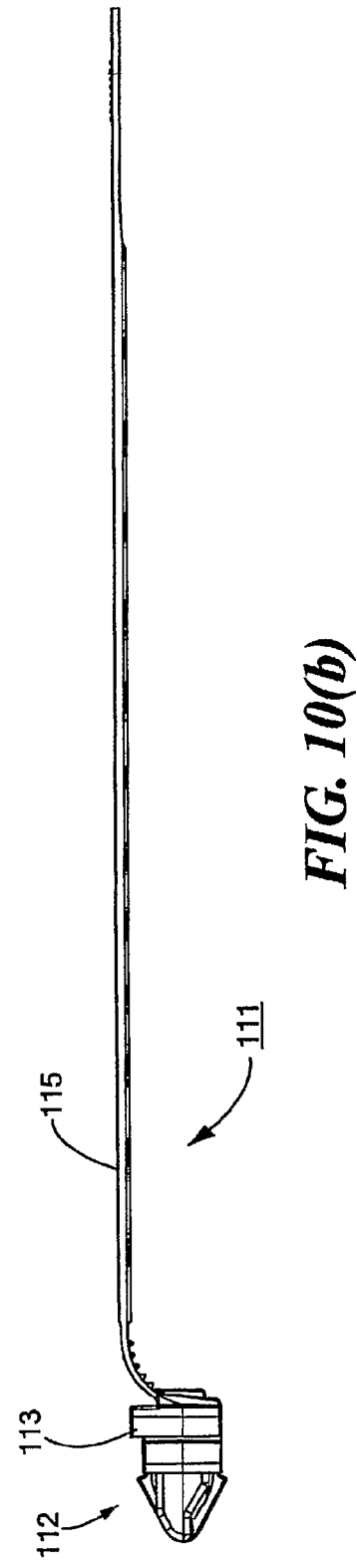
FIG. 10(b) is a front plan view of the cable tie shown in FIG. 10(a)

Numerous modifications could be made to tie 11 without departing from the spirit of the present invention. For example, referring now to FIGS. 10(a) and 10(b), there are shown top plan and front plan views, respectively, of a second embodiment of a cable tie constructed according to the teachings of the present invention, the tie being identified generally as reference numeral 111. As will be described further below, tie 111 is similar to tie 11 in that tie 111 includes an insert fastener 112 which is sized and shaped to be securely retained within a rectangular slot S formed into an automotive panel P.

Tie 111 is similar to tie 11 in that tie 111 comprises a locking head 113 and an attached strap 115, with fastener 112 being formed onto one end of locking head 113. Tie 111 is also similar to tie 11 in that tie 111 is preferably manufactured out of a plastic material, such as nylon, and is preferably formed as a unitary piece using conventional molding techniques.

As can be seen in the drawings, the construction of locking head 113 is similar to locking head 13. Similarly, the construction of attached strap 115 is similar to attached strap 15. As such, it is to be understood that the primary distinction between tie 111 and tie 11 lies in the fact that fastener 112 has a slightly different construction than fastener 12.

Specifically, as seen most clearly in FIGS. 11(a)-(d), outer end wall 125 of locking head 113 has a generally rectangular shape and includes a substantially flat support surface 127, a top edge 129, a bottom edge 131, a first side edge 133 and a second side edge 135. As will be described further below, outer end wall 125 serves as the base, or support, for fastener 112.

A pair of spaced apart, parallel arms 143 and 145 extend orthogonally away from flat support surface 127. In addition, a cross-member 147 extends transversely across the free ends of arms 143 and 145 at an approximate right angle relative thereto. Cross-member 147 includes a flat top surface 147-1 which lies substantially parallel with the top surface of both locking head 113 and strap 115, as seen most clearly in FIG. 11(a). Cross-member 147 additionally includes a flat bottom surface 147-2 which lies substantially parallel with the bottom surface of both locking head 113 and strap 115. Together, support surface 127, arm 143, arm 145 and cross-member 147 define an opening 149 therebetween which is substantially rectangular in lateral cross-section.

Figure 12A:
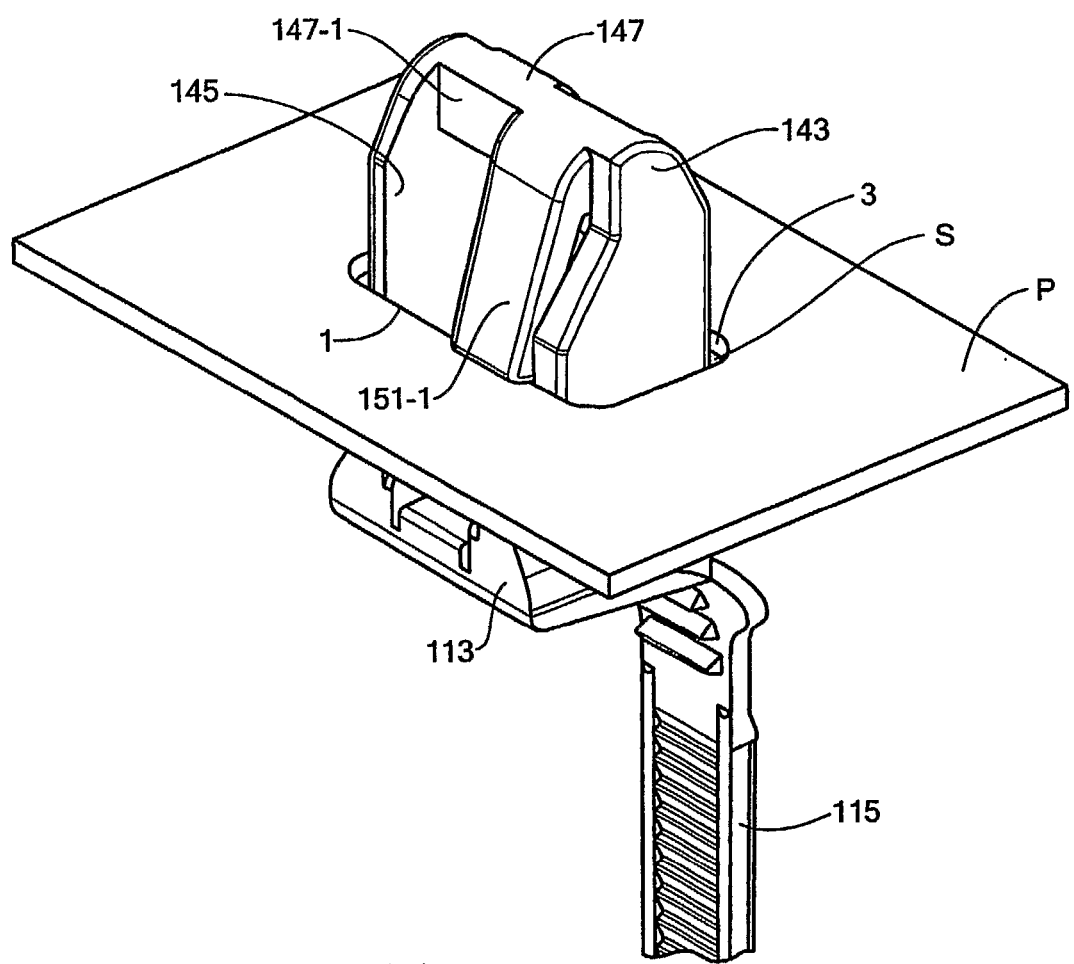
FIG. 12(a) is an enlarged, fragmentary, bottom perspective view of the cable tie shown in FIG. 10(a), the fastener of the cable tie being shown retained within the slot formed in the panel shown in FIG. 1.
Figure 12B:
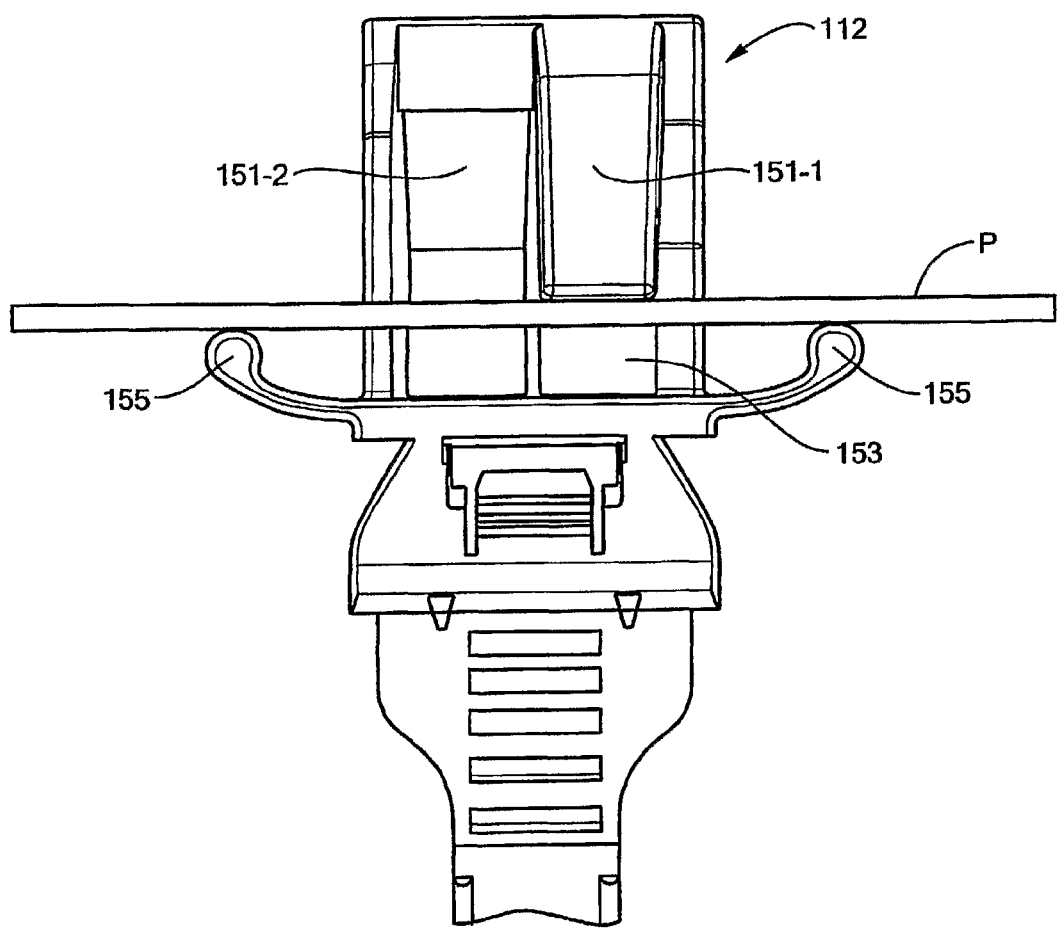
FIG. 12(b) is an enlarged, fragmentary, top plan view of the cable tie shown in FIG. 10(a), the fastener of the cable tie being shown retained within the slot formed in the panel shown in FIG. 1.

Fastener 112 further comprises a pair of pivotable retention fingers 151-1 and 151-2 which serve to retain fastener 112 within rectangular slot S (as shown in FIGS. 12(a) and 12(b)). As will be discussed further below, each retention finger 151 is capable of pivoting inward upon the application of a suitable inward (i.e., compression) force thereon. Upon removal of said inward force, each retention finger 151 is constructed to resiliently pivot back outward and return to its original, relaxed state (as represented in the drawings).

Figure 11A:
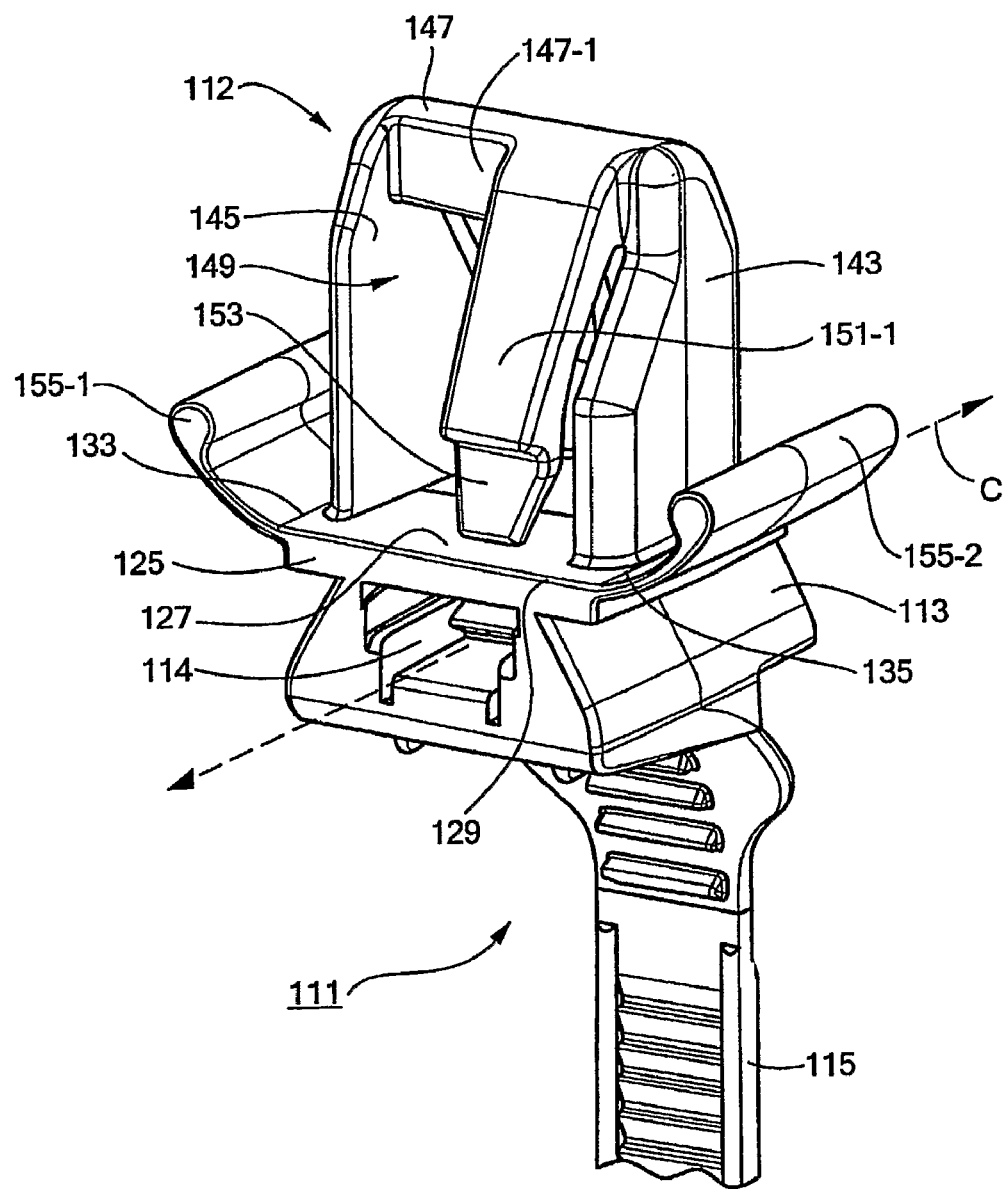
FIG. 11(a) is an enlarged, fragmentary, bottom perspective view of the cable tie shown in FIG. 10(a)
Figure 11B:
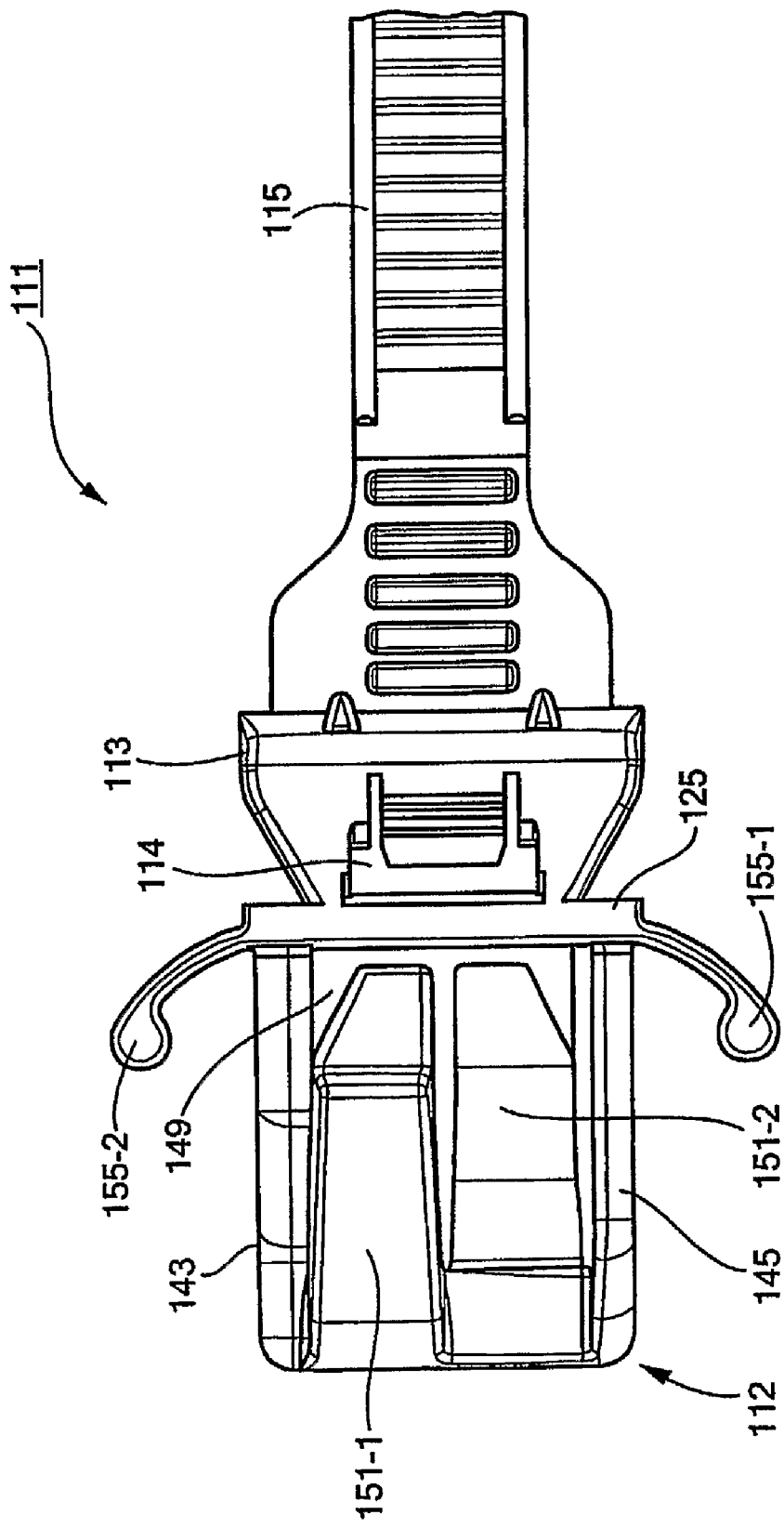
FIG. 11(b) is an enlarged, fragmentary, top plan view of the cable tie shown in FIG. 10(a)
Figure 11C:
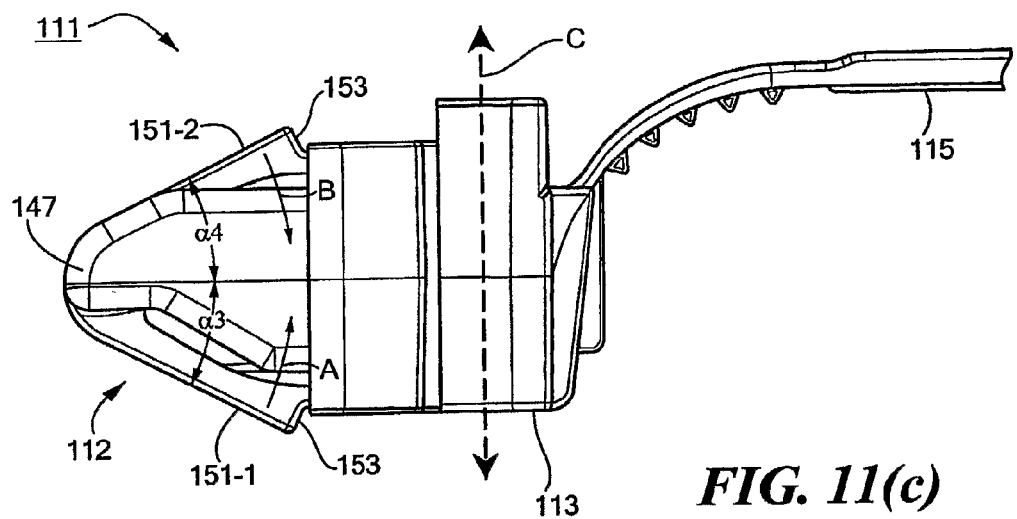
FIG. 11(c) is an enlarged, fragmentary front plan view of the cable tie shown in 10(a)

As seen most clearly in FIGS. 11(a)-(d), a first retention finger 151-1 is formed onto top surface 147-1 of cross-member 147 and projects in towards locking head 113 at an upward acute angle $\alpha 3$ (as shown in FIG. 11(c)). In addition, a second retention finger 151-2 is formed onto bottom surface 147-2 of cross-member 147 and projects in towards locking head 113 at a downward acute angle $\alpha 4$ (as shown in FIG. 11(c)). As such, it is readily apparent that retention fingers 151-1 and 151-2 extend in opposing directions relative to cross-member 147.

As noted briefly above, each retention finger 151 is capable of being pivotably displaced. Specifically, as seen most clearly in FIGS. 11(c) and 11(d), the free end of first retention finger 151-1 can be pivotably displaced inward along an arcuate path upon the application of a suitable compressive force thereon, said arcuate path being represented generally by arrow A. Similarly, the free end of second retention finger 151-2 is capable of being pivotably displaced inward along an arcuate path upon the application of a suitable compressive force thereon, said arcuate path being represented generally by arrow B. As seen most clearly in FIG. 11(d), first and second retention fingers 151-1 and 151-2 are configured such that their free ends do not pivot in the lateral direction (i.e., in the direction outside of arms 143 and 145) in order to preserve the substantially rectangular profile for fastener 112, which is an object of the present invention. It should be noted that, as defined herein, the term "lateral direction" when used with respect to the displacement of fingers 151 denotes in the direction towards side edges 133 and 135 (i.e., in a direction parallel with top edge 129 and bottom edge 131).

Figure 11D:
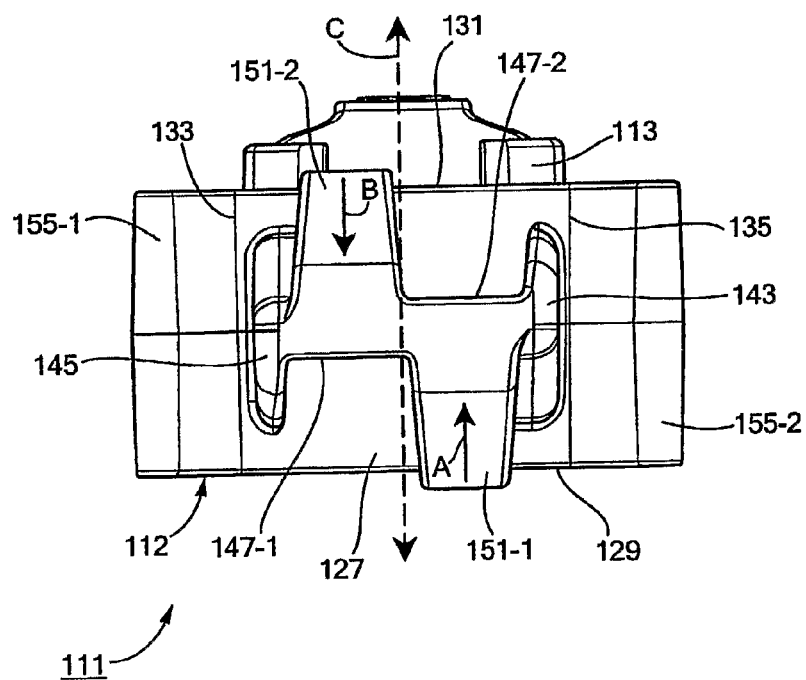
FIG. 11(d) is an enlarged, left end plan view of the cable tie shown in FIG. 10(a)

As a principal feature of the present invention, it should be noted that fastener 112 is specifically designed with retention fingers 151-1 and 151-2 that are offset from one another. As defined herein, the term "offset" as used in conjunction with retention fingers 151 denotes that the arcuate path through which retention finger 151-1 pivots (namely, path A as shown in FIG. 11(d)) is orientated so as not to transect the arcuate path through which retention finger 151-2 pivots (namely, path B as shown in FIG. 11(d)), and vice versa. Stated another way, retention fingers 151 are configured such that retention finger 151-1 and retention finger 151-2 do not align for contact with one another upon the application of a suitable compressive force on their outer surfaces. As a result of this unique offset retention finger design, fastener 112 is constructed such that the inner and outer surfaces of each retention finger 151 are accessible (i.e., unblocked) for molding purposes from both the top direction and the bottom direction. Accordingly, cable tie 111 can be easily manufactured as a unitary plastic member using simplified and inexpensive molding techniques, which is a principal object of the present invention.

As another principal feature of the present invention, it should be noted that each retention finger 151 is configured to pivot along a path which is substantially in parallel with the longitudinal axis of the strap accepting channel 114 in locking head 113. Specifically, as seen most clearly in FIGS. 11(c) and 11(d), retention fingers 151-1 and 151-2 are capable of pivotable displacement along paths A and B, respectively, which are substantially in parallel with the longitudinal axis C of strap accepting channel 114 in locking head 113. Stated another way, retention fingers 151-1 and 151-2 are incapable of lateral deflection (i.e., in the direction towards side edges 133 and 135). Based on this construction, cable tie 111 is capable of being used in such a manner so that (i) fastener 112 can be inserted through slot S with retention fingers 151-1 and 151-2 engaging top edge 1 and bottom edge 3, respectively, (rather than its side edges) while, at the same time, (ii) strap 115 can retain a plurality of wires against panel P as a bundle which extends in a substantially horizontal orientation.

As seen most clearly in FIGS. 11(a) and 11(c), the outer surface of each retention finger 151 is shaped to include a step, or notch, 153 proximate its free end. As can be appreciated, with fastener 112 disposed within slot S, step 153 on retention finger 151-1 is designed to engage top edge 1, as seen most clearly in FIGS. 12(a) and 12(b). Similarly, step 153 on retention fingers 151-2 is designed to engage bottom edge 3. Together, retention fingers 151 create a suitable retention force to secure fastener 112 within slot S.

Referring now to FIGS. 11(a)-11(d), a pair of curved support tabs, or wings, 155 is integrally formed onto outer end wall 125. Specifically, a first support tab 155-1 is integrally formed onto first side edge 133 and a second support tab 155-2 is integrally formed onto second side edge 135. Each support tab 155 is provided with a curved, somewhat concave design. Upon the application of a suitable force, each support tab 155 can flex in such a manner so as to substantially flatten. Due to its resilient construction, each support tab 155 returns to its original curved orientation once the flattening force is withdrawn. In this manner, support tabs 155 can be used to provide a stabilizing retentive force on the underside of the panel P into which fastener 112 is inserted, as seen most clearly in FIG. 12(b).

The embodiments of the present invention described above are intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. A unitary plastic cable tie comprising:
   (a) a head having an outer end wall that includes a support surface, a top edge, a bottom edge, a first side edge and a second side edge, the head being shaped to include an elongated strap accepting channel, the strap accepting channel having a longitudinal axis, said head comprising a locking member which is disposed to project into the strap accepting channel;
   (b) a strap having a top surface, a bottom surface, a first end and a second end, the first end being formed onto said head, said strap being sized and shaped to be inserted into the strap accepting channel so said cable tie forms a closed loop, said strap being adapted to be engaged by said locking member when said cable tie is formed into a closed loop: and
   (c) an insert fastener formed onto the outer end wall of said head, said insert fastener having a rectangular footprint and comprising,
      (i) a pair of spaced apart, planar parallel arms extending orthogonally away from the outer end wall, one of the pair of planar parallel arms extending along the first side edge of the outer end wall and the other of the pair of planar parallel arms extending along the second side edge of the outer end wall, the planar parallel arms defining opposing sides of the rectangular footprint,
      (ii) a cross-member extending transversely across the free ends of the pair of planar parallel arms, and
      (iii) at most a first retention finger and a second retention finger, each of the first and second retention fingers being formed onto said cross-member and having a free end, the free ends of the first and second retention fingers extending outwardly away from each other,
      (iv) wherein said first and second retention fingers are offset and biased in opposite directions from one another, each retention finger capable of being displaced pivotally inward along an arcuate path which is substantially in parallel with the longitudinal axis of the strap accepting channel, each retention finger being orientated so as not to transect the arcuate path through which the other retention finger pivots
      (v) a first curved support tab formed onto the first side edge of the outer end wall and a second curved support tab formed onto the second side edge of the outer end wall, the first and second curved support tabs being separate from one another.

2. The cable tie as claimed in claim 1 wherein said cable tie is formed as a unitary member using conventional molding techniques.

3. The cable tie as claimed in claim 1 wherein each retention finger is incapable of pivotable displacement in the lateral direction.

4. The cable tie as claimed in claim 1 wherein the cross-member comprises a flat top surface that lies substantially parallel with the top surface of the strap, a flat bottom surface that lies substantially parallel with the bottom surface of the strap and a rounded free end, the cross-member being generally rectangular in transverse cross-section.

* * * * *